(12) United States Patent
Yoshitomi et al.

(10) Patent No.: US 11,530,463 B2
(45) Date of Patent: *Dec. 20, 2022

(54) HIGH-STRENGTH GALVANIZED STEEL SHEET, HIGH STRENGTH MEMBER, AND METHOD FOR MANUFACTURING THE SAME

(71) Applicant: JFE Steel Corporation, Tokyo (JP)

(72) Inventors: Hiromi Yoshitomi, Tokyo (JP); Masaki Koba, Tokyo (JP); Tatsuya Nakagaito, Tokyo (JP); Yoshitsugu Suzuki, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 157 days.

This patent is subject to a terminal disclaimer.

(21) Appl. No.: 17/041,743

(22) PCT Filed: Mar. 29, 2019

(86) PCT No.: PCT/JP2019/014235
§ 371 (c)(1),
(2) Date: Sep. 25, 2020

(87) PCT Pub. No.: WO2019/189849
PCT Pub. Date: Oct. 3, 2019

(65) Prior Publication Data
US 2021/0115529 A1 Apr. 22, 2021

(30) Foreign Application Priority Data

Mar. 30, 2018 (JP) .............................. JP2018-068995
Mar. 1, 2019 (JP) .............................. JP2019-037383

(51) Int. Cl.
| | | |
|---|---|---|
| *C21D 9/46* | (2006.01) |
| *C21D 8/02* | (2006.01) |
| *C21D 6/00* | (2006.01) |
| *C22C 38/60* | (2006.01) |
| *C22C 38/16* | (2006.01) |
| *C22C 38/14* | (2006.01) |
| *C22C 38/12* | (2006.01) |
| *C22C 38/08* | (2006.01) |
| *C22C 38/06* | (2006.01) |
| *C22C 38/02* | (2006.01) |
| *C22C 38/00* | (2006.01) |
| *B32B 15/01* | (2006.01) |
| *C23C 2/06* | (2006.01) |
| *C23C 2/02* | (2006.01) |
| *C23C 2/40* | (2006.01) |
| *C22C 38/04* | (2006.01) |

(52) U.S. Cl.
CPC .............. *C21D 9/46* (2013.01); *B32B 15/013* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0273* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/60* (2013.01); *C23C 2/02* (2013.01); *C23C 2/06* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS

2009/0297881 A1  12/2009  Maalman et al.
2014/0234657 A1  8/2014  Azuma et al.
(Continued)

FOREIGN PATENT DOCUMENTS

EP  2921569 A1  9/2015
EP  3106528 A1  12/2016
(Continued)

OTHER PUBLICATIONS

Nakamuara et al., "Influence of Structure on the Stretch Flange Moldability of an Ultrahigh-strength Cold Rolled Steel Sheet", CAMP-ISIJ, vol. 13 (2000), 11 pages, published by The Iron and Steel Institute of Japan.
Hasegawa et al., "Influence of Metal Structure on the Bending Formability of an Ultrahigh-strength Steel Sheet of the 980-MPa Class", CAMP-ISIJ, vol. 20 (2007), 3 pages, published by The Iron and Steel Institute of Japan.
International Search Report and Written Opinion for International Application No. PCT/JP2019/014235, dated Jun. 25, 2019, 8 pages.
Korean Office Action for Korean Application No. 10-2020-7028052, dated Oct. 12, 2021 with Concise Statement of Relevance of office Action, 6 pages.

(Continued)

*Primary Examiner* — Anthony M Liang
(74) *Attorney, Agent, or Firm* — RatnerPrestia

(57) ABSTRACT

A high-strength galvanized steel sheet includes a steel sheet containing a predetermined component element, a mass ratio of a content amount of Si to a content amount of Mn in the steel (Si/Mn) being 0.2 or more, and a steel structure in which an average grain size of inclusions existing in an area extending from a surface to a position of ⅓ of a sheet thickness is 50 μm or less, and an average nearest distance between ones of the inclusions is 20 μm or more; and a galvanized layer provided on a surface of the steel sheet, in which an amount of diffusible hydrogen contained in the steel is less than 0.25 mass ppm, oxides containing predetermined elements in an outer layer portion of the steel sheet account for 0.010 g/m² or more per one surface, and a tensile strength is 1100 MPa or more.

20 Claims, 1 Drawing Sheet

(56) References Cited

U.S. PATENT DOCUMENTS

| | | |
|---|---|---|
| 2014/0322559 A1 | 10/2014 | Becker et al. |
| 2016/0214351 A1 | 7/2016 | Harako et al. |
| 2017/0037488 A1 | 2/2017 | Hasegawa et al. |
| 2017/0044640 A1* | 2/2017 | Kimura ............... B32B 15/013 |
| 2020/0032364 A1 | 1/2020 | Hirashima et al. |
| 2020/0190617 A1 | 6/2020 | Hasegawa et al. |
| 2020/0377978 A1 | 12/2020 | Yoshitomi et al. |
| 2021/0115529 A1 | 4/2021 | Yoshitomi et al. |

FOREIGN PATENT DOCUMENTS

| | | | |
|---|---|---|---|
| EP | 3138931 A | | 3/2017 |
| EP | 3243923 A1 | | 11/2017 |
| EP | 3409806 A1 | | 12/2018 |
| EP | 3633062 A1 | | 4/2020 |
| JP | 6362843 A | | 3/1988 |
| JP | 2003096541 A | | 4/2003 |
| JP | 2006265578 A | | 10/2006 |
| JP | 2007302918 A | | 11/2007 |
| JP | 2011111670 A | | 6/2011 |
| JP | 2011111675 A | | 6/2011 |
| JP | 2013163827 A | | 8/2013 |
| JP | 2017048412 A | | 3/2017 |
| JP | 6271067 B1 | | 1/2018 |
| JP | 6525114 B1 | | 6/2019 |
| WO | 2004063410 A1 | | 7/2004 |
| WO | 2015029404 A1 | | 3/2015 |
| WO | 2017131054 A1 | | 8/2017 |
| WO | 2018124157 A1 | | 7/2018 |
| WO | 2018146828 A1 | | 8/2018 |

OTHER PUBLICATIONS

Chinese Office Action with Search Report for Chinese Application No. 201980023287.0, dated May 17, 2021, 10 pages.

Non Final Office Action for U.S. Appl. No. 16/072,668, dated May 14, 2021, 15 pages.

European Communication pursuant to Article 94(3) for European Application No. 19 775 043.3, dated May 6, 2021, 4 pages.

Non Final Office Action for U.S. Appl. No. 16/765,708, dated Mar. 17, 2022, 12 pages.

Final Office Action for U.S. Appl. No. 16/072,668, dated Sep. 7, 2021, 18 pages.

Japanese Office Action for Japanese Application No. 2020-032927, dated Nov. 27, 2020, with Concise Statement of Relevance of Office Action, 5 pages.

Extended European Search Report for European Application No. 19 775 043.3, dated Nov. 13, 2020, 12 pages.

Non Final Office Action for U.S. Appl. No. 17/041,680, dated May 6, 2022, 13 pages.

Non Final Office Action for U.S. Appl. No. 17/041,690, dated May 6, 2022, 13 pages.

Non Final Office Action for U.S. Appl. No. 17/041,830, dated Jul. 26, 2022, 13 pages.

\* cited by examiner

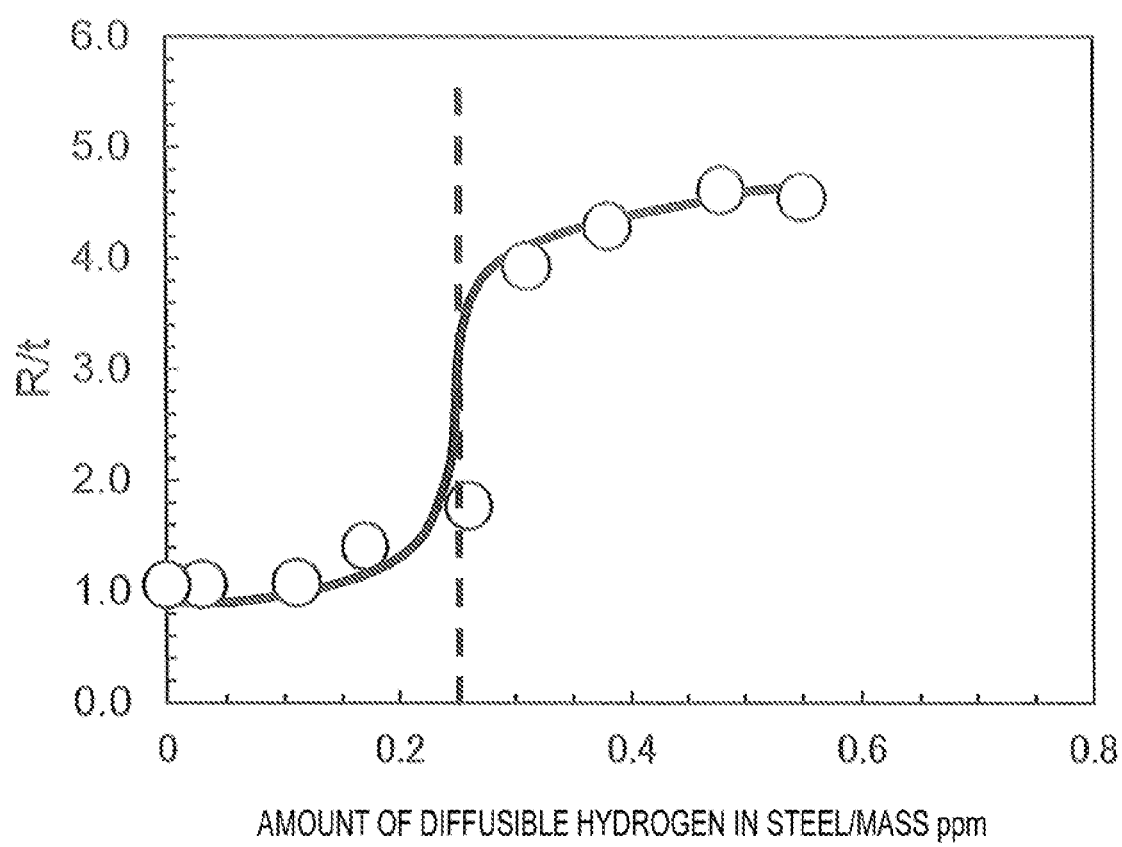

HIGH-STRENGTH GALVANIZED STEEL SHEET, HIGH STRENGTH MEMBER, AND METHOD FOR MANUFACTURING THE SAME

CROSS REFERENCE TO RELATED APPLICATIONS

This is the U.S. National Phase application of PCT/JP2019/014235, filed Mar. 29, 2019, which claims priority to Japanese Patent Application No. 2018-068995, filed Mar. 30, 2018 and Japanese Patent Application No. 2019-037383, filed Mar. 1, 2019, the disclosures of these applications being incorporated herein by reference in their entireties for all purposes.

FIELD OF THE INVENTION

The present invention relates to a high-strength galvanized steel sheet, a high strength member, and a method for manufacturing the same that are excellent in plating ability and bendability, and that is suitable for building materials and automotive collision-resistant parts, and a method for manufacturing the same.

BACKGROUND OF THE INVENTION

In these days when crash safety and fuel efficiency improvement of automobiles are strongly required, the strength increase of steel sheets that are materials of parts is being advanced. Further, in view of the fact that automobiles are being widely spread on a global scale and automobiles are used for various uses in diverse areas and climates, steel sheets that are materials of parts are required to have high antirust properties.

In general, when the strength of a steel sheet is enhanced, the formability of the steel sheet is reduced. In particular, a steel sheet provided with plating tends to have poorer formability than a steel sheet not provided with plating.

If a large amount of an alloying element is incorporated in order to increase strength, it is difficult for a good quality plating film to be formed on the steel sheet. Further, it is known that, if plating of Zn, Ni, or the like is provided, hydrogen that enters during the manufacturing process is less likely to be released from the interior of the steel.

Steel sheets having excellent bendability have thus far been developed. Based on the features of the method for forming such a steel sheet, how to design a location that is exposed to most severe forming conditions at the time of bending, that is, a location where stress is concentrated is presented as a solution to an issue. In particular, in the case of a steel sheet containing two or more kinds of steel structures with different hardnesses, it is likely that deformation will concentrate and defects of microvoids will occur at the interface between steel structures, and consequently bendability is degraded.

Also the control of an atmosphere in the furnace of an annealing-plating step is attempted in order to deposit good quality plating.

In Non-Patent Literatures 1 and 2, while the steel structure of a steel sheet contains ferrite and martensite, a steel structure of ferrite and martensite is temporarily produced and then tempering is performed to soften the martensite, and bendability is improved.

Patent Literature 1 discloses a high-strength steel sheet in which a structure homogeneity index given by a standard deviation of Rockwell hardness of a surface of a steel sheet and serving as an index indicating the homogeneity of the steel sheet is 0.4 or less and that is good in ductility and bendability and has a maximum tensile stress of 900 MPa or more, and a method for manufacturing the same. This literature provides a technique obtained as a result of improving, as a factor influencing bendability, the heterogeneity of a solidified structure at the time of casting, and presents, by this method, a steel sheet that has a maximum tensile stress of 900 MPa or more and is excellent in bendability.

In Patent Literature 1, at this time, the interior of an annealing furnace of a continuous galvanizing line is set to an atmosphere having a hydrogen concentration of 1 to 60 vol % and containing $N_2$, $H_2O$, $O_2$, and incidental impurities as the balance, and the logarithm of the partial pressure of water and the partial pressure of hydrogen in the atmosphere, $\log(P_{H2O}/P_{H2})_1$ is prescribed to $-3 \leq \log(P_{H2O}/P_{H2}) \leq -0.5$ in order to ensure good quality plating ability.

Patent Literature 2 provides a dual-phase steel sheet that contains 50% or more of bainite and 3 to 30% of retained austenite and in which the ratio between the hardness Hvs of an outer layer of the steel sheet and the hardness Hvb of a portion of ¼ of the thickness of the steel sheet is prescribed to 0.35 to 0.90. Further, annealing is performed in an atmosphere in which log(partial pressure of water/partial pressure of hydrogen) is −3.0 to 0.0, and thereby plating ability is ensured in a high alloy system.

Patent Literature 3 ensures bendability by prescribing a decarburized ferrite layer, and discloses, as a technique for manufacturing a plated steel sheet, a method of adjustment to an atmosphere containing 2 to 20 vol % of hydrogen and the balance containing nitrogen and impurities and having a dew-point temperature of more than −30° C. and 20° C. or less.

PATENT LITERATURE

Patent Literature 1: JP 2011-111670 A
Patent Literature 2: JP 2013-163827 A
Patent Literature 3: JP 2017-048412 A

Non-Patent Literature

Non-Patent Literature 1: Kohei Hasegawa, and five others, "980 *MPa-kyu Cho-ko-kyodo Kohan no Mage-kako-sei ni Oyobosu Kinzoku-soshiki no Eikyo*" (Influence of Metal Structure on the Bending Formability of an Ultrahigh-strength Steel Sheet of the 980-MPa Class), CAMP-ISIJ, vol. 20 (2007), p. 437, published by The Iron and Steel Institute of Japan Non-Patent Literature 2: Nobuyuki Nakamura, and three others, "*Cho-ko-kyodo Reien Kohan no Nobi-furanji-seikei-sei ni Oyobosu Soshiki no Eikyo*" (Influence of Structure on the Stretch Flange Moldability of an Ultra-high-strength Cold Rolled Steel Sheet), CAMP-ISIJ, vol. 13 (2000), p. 391, published by The Iron and Steel Institute of Japan

SUMMARY OF THE INVENTION

Thus far, to improve the bendability of a steel sheet, mainly the optimization of steel structure has been made; however, this provides only a certain level of improvement, and further improvement is required. Further, it is presumed that, in the case where a high alloy-based steel sheet is subjected to plating, hydrogen in the atmosphere in the plating step becomes hydrogen in steel remaining in the steel sheet product. It is presumed that improvement in bendability is hindered by the hydrogen in steel. It is also necessary to achieve both improvement in bendability and plating ability.

Aspects of the present invention improve the bendability of a plated steel sheet from a new point of view, and an object according to aspects of the present invention is to provide a high-strength galvanized steel sheet and a high strength member excellent in plating ability and bendability, and a method for manufacturing them.

The high strength referred to in the present specification means that tensile strength (TS) is 1100 MP or more.

The present inventors conducted extensive studies in order to solve the issue mentioned above. As a result, it has been found out that, to improve the bendability of a plated steel sheet, it is necessary to appropriately adjust the amount of hydrogen remaining in the steel in addition to the existence state of inclusions existing from the vicinity of the outer layer in the sheet thickness to near the center of the sheet thickness. Further, it has been found out that a high-strength galvanized steel sheet having good bendability and plating ability is obtained by, in addition to controlling inclusions and adjusting the amount of hydrogen in the steel, setting the steel sheet to a specific chemical composition, adjusting particularly the mass ratio of the content of Si to the content of Mn in the steel (Si/Mn) to a predetermined range, and making adjustment so that the amount of oxides containing predetermined elements and existing in an outer layer portion of the steel sheet is within a predetermined range.

Further, it has been found out that a high-strength galvanized steel sheet according to aspects of the present invention can be manufactured by appropriately adjusting conditions of manufacturing steps, such as conditions of an atmosphere in the furnace during recrystallization annealing. In particular, in the course of studies on manufacturing conditions of a galvanized steel sheet according to aspects of the present invention, the present inventors have found for the first time that the plating ability of the galvanized steel sheet can be dramatically improved by controlling the dew-point temperature of the atmosphere in the furnace in an annealing step to a specific range. This is presumed to be because, by controlling the dew-point temperature, the amount of oxides in an outer layer portion of the steel sheet has been successfully adjusted to within a predetermined range and thereby the external oxidation of Si and Mn has been successfully suppressed. Specifically, aspects of the present invention provide the following.

[1] A high-strength galvanized steel sheet including:

a steel sheet having a chemical composition containing a steel composition containing, in mass %, C: 0.08% or more and 0.20% or less, Si: less than 2.0%, Mn: 1.5% or more and 3.5% or less, P: 0.02% or less, S: 0.002% or less, Al: 0.10% or less, and N: 0.006% or less, a mass ratio of a content of Si to a content of Mn in the steel (Si/Mn) being 0.2 or more, and the balance: Fe and incidental impurities, and a steel structure in which an average grain size of inclusions containing at least one of Al, Si, Mg, and Ca and existing in an area extending from a surface to a position of ⅓ of a sheet thickness is 50 μm or less, and an average nearest distance between the inclusions is 20 μm or more; and a galvanized layer provided on a surface of the steel sheet and having a coating weight per one surface of 20 g/m² or more and 120 g/m² or less, in which an amount of diffusible hydrogen contained in the steel is less than 0.25 mass ppm, oxides containing at least one or more elements selected from Fe, Si, Mn, Al, P, B, Nb, Ti, Cr, Mo, V, Cu, and Ni and existing in an outer layer portion of the steel sheet within 100 μm from a surface of an underlying steel sheet immediately below the galvanized layer account for 0.010 g/m² or more per one surface, and a tensile strength is 1100 MPa or more.

[2] The high-strength galvanized steel sheet according to [1], in which the chemical composition further contains, in mass %, at least one of (1) to (3) below, (1) one or more of Ti, Nb, V, and Zr: 0.005% or more and 0.1% or less in total, (2) one or more of Mo, Cr, Cu, and Ni: 0.01% or more and 0.5% or less in total, and (3) B: 0.0003% or more and 0.005% or less.

[3] The high-strength galvanized steel sheet according to [1] or [2], in which the chemical composition further contains, in mass %, at least one of Sb: 0.001% or more and 0.1% or less and Sn: 0.001% or more and 0.1% or less.

[4] The high-strength galvanized steel sheet according to any one of [1] to [3], in which the chemical composition further contains, in mass %, Ca: 0.0005% or less.

[5] The high-strength galvanized steel sheet according to any one of [1] to [4], in which the steel structure contains 30% or more and 85% or less of martensite, 60% or less (including 0%) of ferrite, 15% or less (including 0%) of bainite, and less than 5% (including 0%) of retained austenite in terms of area ratio, and an average grain size of ferrite is 15 μm or less.

[6] A method for manufacturing a high-strength galvanized steel sheet, including:

a casting step of casting steel having the chemical composition according to any one of [1] to [4] under a condition where a flow velocity of molten steel at a solidification interface in vicinity of a meniscus of a casting mold is 16 cm/second or more, and producing a steel raw material;

a hot rolling step of hot rolling the steel raw material after the casting step;

a pickling step of pickling a steel sheet after the hot rolling step;

a cold rolling step of cold rolling the steel sheet after the pickling step at a rolling reduction ratio of 20% or more and 80% or less;

an annealing step of heating the steel sheet after the cold rolling step in a continuous annealing line at an annealing temperature of 740° C. or more and (Ac3+20°) C. or less in an atmosphere in the furnace in which a hydrogen concentration in a temperature region of 500° C. or more is more than 0 vol % and 12 vol % or less and a dew-point temperature in a temperature region of 740° C. or more is −25° C. or more, and then performing cooling at an average cooling rate of 3° C./s or more from the annealing temperature to at least 600° C.; and a plating step of subjecting the steel sheet after the annealing step to plating treatment, and after the plating treatment, performing cooling at an average cooling rate of 3° C./s or more through a temperature region of 450° C. to 250° C.

[7] The method for manufacturing a high-strength galvanized steel sheet according to [6], further including, after the plating step, a width trimming step of performing width trimming.

[8] The method for manufacturing a high-strength galvanized steel sheet according to [6] or [7], further including, after the annealing step or after the plating step, a post-treatment step of performing heating in a temperature region of 50 to 400° C. for 30 seconds or more in an atmosphere with a hydrogen concentration of 5 vol % or less and a dew-point temperature of 50° C. or less.

[9] The method for manufacturing a high-strength galvanized steel sheet according to any one of [6] to [8], in which alloying treatment is performed immediately after the plating treatment in the plating step.

[10] A high strength member, obtained by subjecting the high-strength galvanized steel sheet according to any one of [1] to [5] to at least either one of forming and welding.

[11] A method for manufacturing a high strength member, including a step of performing at least either one of forming and welding on a high-strength galvanized steel sheet manufactured by the method for manufacturing a high-strength galvanized steel sheet according to any one of [6] to [9].

According to aspects of the present invention, a high-strength galvanized steel sheet and a high strength member excellent in plating ability and bendability and a method for manufacturing them can be provided. In the case where a high-strength galvanized steel sheet according to aspects of the present invention is used for a framework member of an automobile body, the high-strength galvanized steel sheet can make a great contribution to improvement in collision safety and weight reduction.

BRIEF DESCRIPTION OF THE DRAWINGS

The FIGURE is a diagram showing an example of relationship between the amount of diffusible hydrogen in steel and R/t.

DETAILED DESCRIPTION OF EMBODIMENTS OF THE INVENTION

Hereafter, the embodiments of the present invention will be described. Here, the present invention is not limited to the embodiments described below.

A high-strength galvanized steel sheet according to aspects of the present invention includes a steel sheet and a galvanized layer formed on a surface of the steel sheet. First, the chemical composition of the steel sheet (a steel composition) will be described. In the description of the chemical composition of the steel sheet, "%" that is the unit of the content of a component means "mass %".

C: 0.08% or More and 0.20% or Less

C is an effective element to increase the strength of the steel sheet, and contributes to strength increase by forming martensite, which is a hard phase of steel structure. Further, depending on the manufacturing method, C contributes to strength increase also by forming a fine alloy compound or an alloy carbonitride together with a carbide-forming element such as Nb, Ti, V, or Zr. To obtain these effects, the content amount of C needs to be set to 0.08% or more. On the other hand, if the content of C is more than 0.20%, martensite is hardened excessively, and bending formability tends not to be improved even if inclusions or the amount of hydrogen in steel is controlled. Thus, the content of C is set to 0.08% or more and 0.20% or less. From the viewpoint of stably achieving a TS of 1100 MPa or more, the content of C is preferably 0.09% or more.

Si: Less than 2.0%

Si is an element contributing mainly to strength increase by solid solution strengthening; and experiences relatively small reduction in ductility with respect to strength increase, and contributes to not only strength but also improvement in balance between strength and ductility. Improvement in ductility leads to improvement in bendability. On the other hand, Si is likely to form Si-based oxides on the surface of the steel sheet, and may be a cause of bare spot; furthermore, if Si is contained excessively, significant scales are formed during hot rolling and scale flaws are marked on the surface of the steel sheet; consequently, surface quality may be deteriorated, and pickling ability may be reduced. Thus, it is sufficient to add Si only an amount necessary to ensure strength; from the viewpoint of plating ability, the content of Si is set to less than 2.0%. The content amount of Si is preferably 1.8% or less. The lower limit of the content of Si is not particularly prescribed; however, if the content of Si is less than 0.001%, control in manufacturing tends to be difficult; thus, the content of Si is preferably set to 0.001% or more. It is sufficient to add Si only an amount necessary to ensure, and from the viewpoint of obtaining effects of ensuring strength effectively, the content of Si is more preferably 0.3% or more, still preferably 0.4% or more, and particularly preferably 0.5% or more.

Mn: 1.5% or More and 3.5% or Less

Mn is effective as an element contributing to strength increase by solid solution strengthening and martensite formation, and to obtain this effect, the content of Mn needs to be set to 1.5% or more. The content of Mn is preferably 1.9% or more. On the other hand, if the content of Mn is more than 3.5%, unevenness is likely to occur in the steel structure due to segregation or the like of Mn and formability decreases, and Mn is likely to be externally oxidized as oxides or composite oxides on the surface of the steel sheet, and may be a cause of bare spot. Thus, the content of Mn is set to 3.5% or less.

P: 0.02% or Less

P is an effective element contributing to the strength increase of the steel sheet by solid solution strengthening, but on the other hand influences plating ability. In particular, P causes degradation in wettability with the steel sheet and reduction in the alloying rate of a coating layer, and there is great influence particularly in a high alloy system whereby a high-strength steel sheet is obtained. Thus, the content amount of P is set to 0.02% or less. The content of P is preferably 0.01% or less. The lower limit of the content of P is not particularly prescribed; however, if the lower limit is less than 0.0001%, a reduction in production efficiency and dephosphorization cost increase are brought about in the manufacturing process; thus, the content of P is preferably set to 0.0001% or more.

S: 0.002% or Less

S is likely to form sulfide-based inclusions in the steel. In particular, in the case where a large amount of Mn is added for strength increase, MnS-based inclusions are likely to be formed. This is a cause of impairing bendability; in addition, S causes hot brittleness, and gives adverse effect on the manufacturing process; thus, the amount of S is preferably reduced as much as possible. In accordance with aspects of the present invention, up to 0.002% is acceptable. The lower limit of the content of S is not particularly prescribed; however, if the lower limit is less than 0.0001%, a reduction in production efficiency and cost increase are brought about in the manufacturing process; thus, the content of S is preferably set to 0.0001% or more.

Al: 0.10% or Less

Al is added as a deoxidizer. In the case where Al is added as a deoxidizer, it is preferable that 0.001% or more of Al be contained in order to obtain this effect. On the other hand, if the content of Al is more than 0.10%, inclusions are likely to be formed during the manufacturing process, and bendability is degraded. Thus, the content of Al is set to 0.10% or less, and is preferably 0.08% or less as sol. Al in the steel.

N: 0.006% or Less

If the content of N is more than 0.006%, excessive nitrides are produced in the steel and formability is reduced, and the deterioration of the surface quality of the steel sheet may be caused. Hence, the content of N is set to 0.006% or less, and preferably 0.005% or less. If there is ferrite, although the content amount is preferably as small as possible from the viewpoint of improving ductility by refining ferrite, such amounts reduce production efficiency and increase cost in the manufacturing process; thus, the content of N is preferably set to 0.0001% or more.

The mass ratio of the content of Si to the content of Mn in the steel (Si/Mn) is 0.2 or more.

To obtain excellent plating ability, the control of elements that are likely to be oxidized in the steel is important; thus, from the viewpoint of suppressing the external oxidation of Mn, an aim is to form Si—Mn composite oxides in the interior of the steel sheet. If the mass ratio of the content of Si to the content of Mn in the steel (Si/Mn) is less than 0.2, a sufficient amount of oxides are not obtained in an outer layer portion of the steel sheet within 100 μm from the surface of the underlying steel sheet immediately below the galvanized layer (hereinafter, also referred to as simply "the surface of the underlying steel sheet"). Thus, the mass ratio of the content of Si to the content of Mn in the steel (Si/Mn) is set to 0.2 or more. From the viewpoint of obtaining a sufficient amount of oxides in the outer layer portion of the steel sheet, the mass ratio of the content of Si to the content of Mn in the steel (Si/Mn) is preferably 0.20 or more, and more preferably 0.25 or more. The upper limit of the mass ratio of the content of Si to the content of Mn in the steel (Si/Mn) is not particularly prescribed, but is often 1.3 or less in the chemical composition according to aspects of the present invention.

The steel according to aspects of the present invention basically contains the chemical composition mentioned above, and the balance is iron and incidental impurities. In the chemical composition mentioned above, the components mentioned below may be further contained as arbitrary components to the extent that the action according to aspects of the present invention is not impaired. In the case where any of the arbitrary elements mentioned below is contained at less than the lower limit value mentioned below, it is assumed that the arbitrary component is contained as an incidental impurity. Further, in the chemical composition, Mg, La, Ce, Bi, W, and Pb may be contained as incidental impurities up to 0.002% in total.

The chemical composition mentioned above may further contain, as arbitrary components, at least one of (1) to (3) below in mass %.

(1) one or more of Ti, Nb, V, and Zr: 0.005% or more and 0.1% or less in total, (2) one or more of Mo, Cr, Cu, and Ni: 0.01% or more and 0.5% or less in total, and (3) B: 0.0003% or more and 0.005% or less.

Ti, Nb, V, and Zr form, together with C or N, carbides or nitrides (also possibly carbonitrides). These elements contribute to the strength increase of the steel sheet by being formed in fine precipitates. In particular, by precipitating these elements in soft ferrite, the strength of the soft ferrite is enhanced, and the strength difference with martensite is reduced; this effect contributes to improvement in not only bendability but also stretch flangeability. Further, these elements have the action of refining the structure of a hot rolled coil; thus, contribute to strength increase and improvement in formability such as bendability also by refining the steel structure after cold rolling and annealing subsequent to the hot rolling. From the viewpoint of obtaining this effect, it is preferable that one or more of Ti, Nb, V, and Zr be contained at 0.005% or more in total. However, excessive addition increases deformation resistance during cold rolling and inhibits productivity, and the presence of surplus or coarse precipitates tends to reduce the ductility of ferrite and reduce the ductility or bendability of the steel sheet. Hence, it is preferable that one or more of Ti, Nb, V, and Zr be contained 0.1% or less in total.

The elements of Mo, Cr, Cu, and Ni enhance hardenability and facilitate generation of martensite, and are therefore elements contributing to strength increase. To obtain these effects, the lower limit mentioned above of 0.01% is prescribed as a preferred lower limit. Excessive addition of Mo, Cr, Cu, and Ni leads to the saturation of the effect and cost increase; further, Cu induces cracking during hot rolling, and is a cause of the occurrence of surface flaws. Thus, it is preferable that one or more of Mo, Cr, Cu, and Ni be contained 0.5% or less in total. Ni has the effect of impeding the occurrence of surface flaws resulting from Cu addition, and is therefore preferably added in a simultaneous manner when Cu is added. In particular, the content of Ni is preferably ½ or more of the amount of Cu.

Also for B, in addition to the lower limit mentioned above for obtaining the effect of suppressing ferrite formation occurring during an annealing cooling process, an upper limit is provided for the excessive addition due to the saturation of the effect. Excessive hardenability has also a disadvantage such as weld cracking during welding. Thus, content of B is preferably set to 0.0003% or more and 0.005% or less.

The chemical composition mentioned above may further contain, as an optional component, the following component.

At least one of Sb: 0.001% or more and 0.1% or less and Sn: 0.001% or more and 0.1% or less Sb and Sn are effective elements to suppress decarburization, denitrification, deboronization, etc., and suppress the strength reduction of the steel sheet; thus, the content of each element is preferably 0.001% or more. However, excessive addition reduces surface quality; thus, the upper limit of the content of each element is preferably set to 0.1%.

Ca: 0.0005% or Less

When a small amount of Ca is added, the effect of spheroidizing the shapes of sulfides and improving the bendability of the steel sheet is obtained. On the other hand, if Ca is added excessively, Ca forms sulfides or oxides in the steel excessively, and reduces the formability, particularly bendability, of the steel sheet; thus, the content of Ca is preferably set to 0.0005% or less. The lower limit of the content of Ca is not particularly prescribed; however, in the case where Ca is contained, the content of Ca is often 0.0001% or more.

Next, the steel structure of the steel sheet is described.

In the steel structure, the average grain size of inclusions containing at least one of Al, Si, Mg, and Ca and existing in an area extending from a surface to a position of ⅓ of the sheet thickness is 50 μm or less, and the average nearest distance between inclusions is 20 μm or more. Bendability can be improved when the average grain size of inclusions and the average nearest distance between inclusions are adjusted to the ranges mentioned above and the amount of diffusible hydrogen in the steel is set in a specific range. In the measurement of the nearest distance between inclusions, inclusions other than inclusions containing at least one of Al, Si, Mg, and Ca are not included.

The average grain size of inclusions is 50 μm or less, preferably 30 μm or less, and more preferably 20 μm or less. The average grain size of inclusions is preferably as small as possible; thus, the lower limit is not particularly prescribed, but is often 1 μm or more.

The average nearest distance of inclusions is 20 μm or more, preferably 30 μm or more, and more preferably 50 μm or more. As for the average nearest distance of inclusions, the upper limit is not particularly prescribed, but is often 500 μm or less.

The average grain size of inclusions and the average nearest distance between inclusions are measured by methods described in Examples.

Further, in accordance with aspects of the present invention, the steel structure of a steel sheet preferably contains 30% or more and 85% or less of martensite, 60% or less (including 0%) of ferrite, 15% or less (including 0%) of bainite, and less than 5% (including 0%) of retained austenite in terms of area ratio, and an average grain size of ferrite is 15 μm or less.

Martensite: 30% or More and 85% or Less

Martensite is a hard structure, and is effective and essential to enhance the strength of the steel sheet. In order to ensure a tensile strength (TS) of 1100 MPa or more, the amount of martensite is preferably set to 30% or more in terms of area ratio. From the viewpoint of ensuring TS stably, the amount of martensite is preferably set to 45% or more. The martensite herein includes autotempered martensite that is self-tempered during manufacturing and, depending on the circumstances, tempered martensite that is tempered by a subsequent heat treatment. From the viewpoint of the balance between bendability and strength, the amount of martensite is preferably set to 85% or less.

Ferrite: 60% or Less (Including 0%)

In the case where heat treatment and a step of providing plating are performed in an atmosphere where hydrogen exists, hydrogen enters the interior of the steel and remains in the steel. As a technique for reducing the amount of hydrogen in the steel of the end product as much as possible, ferrite and bainite having BCC structures are formed in the steel structure before providing plating. This utilizes the fact that the solid solubility of hydrogen is smaller in ferrite and bainite having BCC structures than in austenite having an FCC structure. Further, soft ferrite improves the ductility of the steel sheet, and improves bendability. However, if ferrite exceeds 60%, strength cannot be ensured; thus, a preferred upper limit is set to 60%. Ferrite often accounts for 2% or more.

The average grain size of ferrite is preferably 15 μm or less. The smaller the ferrite grain size is, the more the generation and linkage of voids on the bending surface can be suppressed, and the more the bendability can be enhanced. The average grain size of ferrite is more preferably 10 μm or less, and still more preferably 4 μm or less.

Bainite: 15% or Less (Including 0%)

Bainite contributes to improvement in bendability, and may therefore be contained; however, if bainite is contained excessively, desired strength is not obtained; thus, the amount of bainite is preferably set to 15% or less. Bainite often accounts for 2% or more.

Retained Austenite Accounting for Less than 5% (Including 0%)

Austenite is an fcc phase; as compared to ferrite (a bcc phase), austenite has high ability of occluding hydrogen, and is diffused slowly in the steel and is therefore likely to remain in the steel. Further, in the case where the retained austenite experiences strain-induced transformation to martensite, there is a concern that the amount of diffusible hydrogen in the steel will be increased. Thus, in accordance with aspects of the present invention, retained austenite preferably accounts for less than 5%.

The steel structure occasionally contains precipitates of pearlite, carbides, etc. in the balance, as structures other than the structures (phases) mentioned above; these can be permitted as long as they account for 10% or less as the total area ratio in a position of ¼ of the sheet thickness from the surface of the steel sheet. The amount of these other structures is preferably set to 5% or less (including 0%).

The inclusions and the area ratios of the steel structure mentioned above are found by methods described in Examples.

Next, the galvanized layer is described. For the galvanized layer, the coating weight per one surface is 20 to 120 g/m$^2$. If the coating weight is less than 20 g/m$^2$, it is difficult to ensure corrosion resistance. Thus, the coating weight is set to 20 g/m$^2$ or more, preferably 25 g/m$^2$ or more, and more preferably 30 g/m$^2$ or more. On the other hand, if the coating weight is more than 120 g/m$^2$, plating peeling resistance is degraded. Thus, the coating weight is 120 g/m$^2$ or less, preferably 100 g/m$^2$ or less, and more preferably 80 g/m$^2$ or less.

The composition of the galvanized layer is not particularly limited, and may be a common composition. For example, in the case of a hot-dip galvanized layer or an alloyed hot-dip galvanized layer, the composition is generally a composition containing Fe: 20 mass % or less and Al: 0.001 mass % or more and 1.0 mass % or less, further containing one or two or more selected from Pb, Sb, Si, Sn, Mg, Mn, Ni, Cr, Co, Ca, Cu, Li, Ti, Be, Bi, and REMs at 0 mass % or more and 3.5 mass % or less in total, and containing the balance containing Zn and incidental impurities. In accordance with aspects of the present invention, it is preferable to have a hot-dip galvanized layer in which the coating weight per one surface is 20 to 120 g/m$^2$ or an alloyed hot-dip galvanized layer in which the hot-dip galvanized layer is further alloyed. In the case where the coating layer is a hot-dip galvanized layer, the content of Fe in the coating layer is preferably less than 7 mass %; in the case where the coating layer is an alloyed hot-dip galvanized layer, the content of Fe in the coating layer is preferably 7 to 20 mass %.

In the high-strength galvanized steel sheet according to aspects of the present invention, the amount of diffusible hydrogen in the steel obtained by measurement by a method described in Examples is less than 0.25 mass ppm. Diffusible hydrogen in the steel degrades bendability. If the amount of diffusible hydrogen in the steel is 0.25 mass ppm or more, bendability is deteriorated even if inclusions and steel structure are produced properly.

In accordance with aspects of the present invention, it has been revealed that a stable improvement effect is provided by setting the amount of diffusible hydrogen in the steel to less than 0.25 mass ppm. The amount of diffusible hydrogen in the steel is preferably 0.20 mass ppm or less, and more preferably 0.15 mass ppm or less. The lower limit is not particularly limited, but is preferably as small as possible; thus, the lower limit is 0 mass ppm. In accordance with aspects of the present invention, it is necessary that, before subjecting the steel sheet to forming or welding, diffusible hydrogen in the steel account for less than 0.25 mass ppm. Note that, if the amount of diffusible hydrogen in the steel measured by using a sample cut out from a product (a member) that is obtained after subjecting the steel sheet to forming or welding and that is placed in a common usage environment is less than 0.25 mass ppm, the amount of diffusible hydrogen in the steel can be regarded as having been less than 0.25 mass ppm also before the forming or the welding.

In the high-strength galvanized steel sheet according to aspects of the present invention, oxides containing at least one or more elements selected from Fe, Si, Mn, Al, P, B, Nb, Ti, Cr, Mo, V, Cu, and Ni and existing in an outer layer portion of the steel sheet within 100 μm from the surface of the underlying steel sheet immediately below the galvanized layer account for 0.010 g/m² or more per one surface. In order that a hot-dip galvanized steel sheet in which Si and a large amount of Mn are added in steel can be caused to satisfy good external appearance and plating adhesiveness at the time of forming, it is necessary to control the amount of oxides in an outer layer of the base steel immediately below the coating layer, which oxides can be starting points of cracking during high degree of forming. Thus, in accordance with aspects of the present invention, the dew-point temperature is controlled in an annealing step described later in order to control an oxygen potential. Thereby, the oxygen potential is enhanced; accordingly, Si, Mn, etc., which are easily oxidizable elements, experience internal oxidation in advance immediately before plating, and the activity of Si and Mn in an outer layer portion of the base steel is reduced; thus, external oxidation is suppressed, and consequently improvement in plating external appearance and adhesiveness is achieved. This effect of improvement is made significant by causing oxides containing at least one or more elements selected from Fe, Si, Mn, Al, P, B, Nb, Ti, Cr, Mo, V, Cu, and Ni and existing in an outer layer portion of the steel sheet within 100 μm from the surface of the underlying steel sheet to exist at 0.010 g/m² or more per one surface. Such oxides preferably account for 0.060 g/m² or more. On the other hand, even if such oxides are caused to exist at more than 0.30 g/m², the effect is saturated; thus, the amount of such oxides is preferably set to 0.30 g/m² or less. The oxides containing at least one or more elements selected from Fe, Si, Mn, Al, P, B, Nb, Ti, Cr, Mo, V, Cu, and Ni and existing in an outer layer portion of the steel sheet within 100 μm from the surface of the underlying steel sheet are measured by a method described in Examples.

The high-strength galvanized steel sheet according to aspects of the present invention has high tensile strength (TS). Specifically, the tensile strength (TS) measured by a method described in Examples is 1100 MPa or more. The sheet thickness of the high-strength galvanized steel sheet according to aspects of the present invention is not particularly limited, but is preferably set to 0.5 mm or more and 3 mm or less.

Next, a method for manufacturing a high-strength galvanized steel sheet according to aspects of the present invention is described. The manufacturing method according to aspects of the present invention includes a casting step, a hot rolling step, a pickling step, a cold rolling step, an annealing step, and a plating step. Each step will now be described. The temperatures at the time of heating or cooling slabs (steel raw materials), steel sheets, etc. shown below mean, unless otherwise stated, the surface temperatures of the slabs (the steel raw materials), the steel sheets, etc.

The casting step is a step of casting steel having the chemical composition mentioned above under a condition where the flow velocity of molten steel at the solidification interface in the vicinity of the meniscus of the casting mold is 16 cm/s or more, and producing a steel raw material.

Manufacturing of Steel Raw Material (Slab (Cast Piece))

As the steel used in the manufacturing method according to aspects of the present invention, steel manufactured by a continuous casting method, generally called a slab, is used; this is for the purpose of preventing macrosegregation of alloy components; the manufacturing may be performed also by an ingot casting, a thin slab casting method, or the like.

In the case where continuous casting is performed, casting is performed under a condition where the flow velocity of molten steel at the solidification interface in the vicinity of the meniscus of the casting mold (hereinafter, also referred to simply as the flow velocity of molten steel) is 16 cm/s or more, from the viewpoint of controlling inclusions. The flow velocity of molten steel is preferably 17 cm/s or more. By increasing the flow velocity of molten steel, it becomes easy to obtain a steel sheet according to aspects of the present invention; thus, the upper limit is not particularly prescribed; however, from the viewpoint of operating stability, the upper limit is preferably set to 50 cm/s or less. "The vicinity of the meniscus of the casting mold" means the interface between powder used during continuous casting and molten steel in the casting mold. In the case of ingot making, it is preferable that inclusions be caused to sufficiently float up during solidification, the place where the inclusions float up and gather be cut off, and the resulting piece be used for the next step.

A hot rolling step is a step of hot rolling the steel raw material after the casting step After a steel slab has been manufactured, hot rolling may be performed by using any one of a conventional method in which the slab is reheated after having been cooled to room temperature, a method in which hot rolling is performed after the slab has been charged into a reheating furnace in the warm state without having been cooled to near-room temperature, a method in which hot rolling is performed immediately after the slab has been subjected to heat retention for a short time, and a method in which hot rolling is performed directly on a cast piece in the hot state without problem.

The method of hot rolling is not particularly prescribed, but is preferably performed under the following conditions.

It is preferable that the steel slab reheating temperature be 1100° C. or more and 1350° C. or less. The grain diameter of precipitates in the steel slab tends to increase, and there is a disadvantage in that it is difficult, for example, to achieve satisfactory strength through precipitation strengthening. Because there may be a case where precipitates having a large grain diameter have negative effects on the formation of a microstructure in the subsequent annealing process. Further, achieving a smooth steel sheet surface by heating in order to remove, for example, blowholes and defects from the surface of the slab through scale off so that there is a decrease in the number of cracks and in the degree of asperity on the surface of a steel sheet is advantageous as product quality. From this viewpoint, the slab reheating temperature is prescribed. It is preferable that the reheating temperature be 1100° C. or more in order to realize such an effect. On the other hand, in the case where the heating temperature is more than 1350° C., since there is an increase in austenite grain diameter, there is an increase in the grain diameter of the steel structure of a final product, which may result in a deterioration in the strength and bendability of a steel sheet, therefore, the preferable upper limit is prescribed.

In the hot rolling step including rough rolling and finish rolling, generally, a steel slab is made into a sheet bar by performing rough rolling, and the sheet bar is made into a hot-rolled coil by performing finish rolling, however, there is no problem in the case where rolling is performed regardless of such a classification depending on, for example, rolling mill capacity as long as a predetermined size is obtained.

The following are recommended as hot rolling conditions.

The finishing delivery temperature is preferably set in the range of 800° C. or more and 950° C. or less. This is aimed at, by the setting to 800° C. or more, making uniform the structure obtained in the hot rolled coil and allowing also the structure of the end product to be uniform. If the structure is non-uniform, bendability tends to be reduced. On the other hand, in the case where the finishing delivery temperature is more than 950° C., since there is an increase in the amount of oxides (scale) formed, there is an increase in the degree of asperity of an interface between the base steel and the oxides, which may tend to result in a deterioration in the surface quality after pickling or cold rolling. Further, the crystal grain size is increased, and this tends to be a cause of reducing the strength and the bendability of the steel sheet, like in a steel slab.

The hot rolled coil (hot rolled sheet) after completion of the hot rolling as described above is, for the purpose of the refinement and homogenization of a microstructure, preferably started to be cooled within 3 seconds after finish rolling has been performed at an average cooling rate of 10 to 250° C./s in a temperature region from [finishing delivery temperature] to [finishing delivery temperature-100]° C., and coiled in a temperature region from 450 to 700° C.

The pickling step is a step of pickling the steel sheet after the hot rolling step. Scales are dropped by pickling. Pickling conditions may be set as appropriate.

The cold rolling step is a step of cold rolling the steel sheet after the pickling step at a rolling reduction ratio of 20% or more and 80% or less.

The reason why the rolling reduction ratio is set to 20% or more is that it is attempted to obtain uniform fine steel structure in the annealing step subsequently performed. If the rolling reduction ratio is less than 20%, it is likely that coarse grains will be produced and non-uniform structure will be produced during annealing, and it is feared that strength and formability in the end product sheet will be reduced as described above. For the upper limit, a high rolling reduction ratio may cause not only reduction in productivity due to the rolling load but also shape failure; thus, the upper limit is set to 80%. It is also possible to perform pickling after cold rolling.

The annealing step is a step of heating the steel sheet after the cold rolling step in a continuous annealing line at an annealing temperature of 740° C. or more and (Ac3+20°) C. or less, in an atmosphere in the furnace in which a hydrogen concentration in a temperature region of 500° C. or more is more than 0 vol % and 12 vol % or less and a dew-point temperature in a temperature region of 740° C. or more is −25° C. or more, and then performing cooling at an average cooling rate of 3° C./s or more from the annealing temperature to at least 600° C. The cooling stop temperature of cooling is not particularly limited. The Ac3 transformation point (in the present specification, also written as simply Ac3) is calculated in the following way.

$$Ac3(°\ C.) = 910 - 203(C)_{1/2} + 44.7Si - 30Mn - 11P + 700S + 400Al + 400Ti.$$

The atomic symbols in the equations above respectively denote the contents (mass %) of the corresponding chemical elements, and where the symbol of a chemical element which is not contained is assigned a value of 0.

If the hydrogen concentration of the in-furnace atmosphere in the temperature region of 500° C. or more is too high, there is a problem that the amount of diffusible hydrogen in the steel prescribed in accordance with aspects of the present invention becomes more than the upper limit; if the annealing temperature is too low, there is a problem of poor plating ability; thus, the hydrogen concentration of the in-furnace atmosphere in the temperature region of 500° C. or more is set to more than 0 vol % and 12 vol % or less. The hydrogen concentration is preferably 10 vol % or less. From the viewpoint of improving plating ability, the hydrogen concentration is preferably 1 vol % or more, and more preferably 3 vol % or more.

In an in-furnace atmosphere in which the dew-point temperature in the temperature region of 740° C. or more is less than −25° C., in the present component system, composite oxides containing Si and Mn are less likely to be formed, and a sufficient amount of oxides are not obtained in an outer layer portion of the steel sheet within 100 μm from the surface of the underlying steel sheet; thus, the effect of suppressing the external oxidation of Si and Mn is insufficient, and bare spot occurs. Hence, the dew-point temperature in the annealing region of 740° C. or more is set to −25° C. or more. The upper limit of the dew-point temperature in the annealing region of 740° C. or more is not particularly prescribed, but is preferably 10° C. or less in view of the concern of the degradation of the roll due to pickup, etc.

The dew-point temperature for 740° C. or less, at which the influence on the oxidation of Si and Mn is small, is not particularly prescribed, but is preferably −55° C. or more and 10° C. or less in view of the fact that it is very difficult to maintain a dew-point temperature of −55° C. or less from the viewpoint of ensuring the airtightness of the furnace body and that dew-point temperatures of 10° C. or more have the concern of the degradation of the roll due to pickup, etc.

If the annealing temperature is too high, there is a problem that the amount of diffusible hydrogen in the steel prescribed in according to aspects the present invention exceeds the upper limit; if the annealing temperature is too low, there is a problem that the tensile strength prescribed in according to aspects the present invention is not obtained; thus, the annealing temperature is set to 740° C. or more and (Ac3+ 20°) C. or less.

If the average cooling rate from the annealing temperature to at least 600° C. is too slow, there is a problem that an amount of martensite for obtaining desired characteristics cannot be ensured; thus, the average cooling rate is set to 3° C./s or more. The average cooling rate from the annealing temperature to at least 600° C. is preferably 4° C./s or more. The reason for focusing on the temperature region of the annealing temperature to at least 600° C. is that this temperature region is a temperature region that influences the amount of austenite to become martensite. The upper limit of the average cooling rate from the annealing temperature to at least 600° C. is not particularly prescribed; however, from the viewpoint of energy saving of the cooling facility, the upper limit is preferably set to 200° C./s or less.

It is also possible to employ a procedure in which cooling is performed from the annealing temperature to 600° C., subsequently cooling is temporarily performed to a temperature of 600° C. or less, and reheating is performed for retaining the steel sheet in the temperature region of 450 to 550° C. In this case, in the case where cooling is performed up to the Ms point or less, tempering may be performed after martensite is generated.

The plating step is a step of subjecting the steel sheet after the annealing step to plating treatment and after the plating treatment, performing cooling at an average cooling rate of 3° C./s or more through the temperature region of 450° C. to 250° C.

If the average cooling rate in the temperature region of 450° C. to 250° C. after plating treatment is too slow, there is a problem that an amount of martensite necessary to obtain the effect according to aspects of the present invention is less likely to be generated; thus, the average cooling rate is set to 3° C./s or more. The average cooling rate from 450° C. to 250° C. after plating treatment is preferably 5° C./s or more. The reason for focusing on the temperature region of 450 to 250° C. is that the temperatures from the plating temperature and/or the plating alloying temperature to the martensite transformation start temperature (the Ms point) are taken into consideration. The upper limit of the average cooling rate of the region from 450° C. to 250° C. after plating treatment is not particularly prescribed; however, from the viewpoint of energy saving of the cooling facility, the upper limit is preferably set to 2000° C./s or less.

Galvanization is performed by, for example, immersion in a hot-dip galvanization bath. Hot-dip galvanization treatment may be performed by a usual method, and adjustment is made so that the coating weight per one surface is in the range mentioned above.

Alloying treatment of galvanization may be performed immediately after galvanization treatment, as necessary. In this case, the steel sheet is held in the temperature region of 480 to 580° C. for approximately 1 to 60 seconds.

From the viewpoint of reducing the amount of diffusible hydrogen, it is preferable to further include, after the annealing step or after the plating step, a post-treatment step of performing heating in a temperature region of 50 to 400° C. for 30 seconds or more in an atmosphere with a hydrogen concentration of 5 vol % or less and a dew-point temperature of 50° C. or less. The post-treatment step is preferably performed as the next step after the annealing step or the plating step.

If the hydrogen concentration and the dew-point temperature of the post-treatment step are too high, conversely there is a concern that hydrogen will be likely to enter the interior of the steel and the amount of diffusible hydrogen in the steel prescribed in according to aspects the present invention will be more than the upper limit; thus, it is preferable to create an atmosphere with a hydrogen concentration of 5 vol % or less and a dew-point temperature of 50° C. or less.

If the heating time in the temperature region of 50 to 400° C. is short, the effect of reducing the amount of diffusible hydrogen in the steel is small, and the present step produces only an increase in the number of steps; thus, the heating time in the temperature region of 50 to 400° C. is preferably set to 30 seconds or more. The reason for focusing on the temperature region of 50 to 400° C. is that it is presumed that, in this temperature region, dehydrogenation reaction progresses more than the entry of hydrogen and that, at this temperature or more, there is a concern that material quality and the properties of the coating layer will be degraded.

After the plating step, a width trimming step of performing width trimming may be further included. In the width trimming step, an end portion in the sheet width direction of the steel sheet is sheared. This provides the effect of not only adjusting the width of the product but also reducing the amount of diffusible hydrogen in the steel by diffusible hydrogen being removed from the shear end surface.

The manufacturing of a high-strength galvanized steel sheet according to aspects of the present invention may be performed in a continuous annealing line, or may be performed off-line. <High strength member and method for manufacturing same>

A high strength member according to aspects of the present invention is a member obtained by subjecting a high-strength galvanized steel sheet according to aspects of the present invention to at least either one of forming and welding. A method for manufacturing a high strength member according to aspects of the present invention includes a step of performing at least either one of forming and welding on a high-strength galvanized steel sheet manufactured by a method for manufacturing a high-strength galvanized steel sheet according to aspects of the present invention.

The high strength member according to aspects of the present invention is excellent in bendability; thus, can suppress cracking after bending, and has high reliability in terms of structure as a member. Further, the high strength member is excellent in plating ability, particularly plating peeling resistance. Hence, for example, at the time of press forming a steel sheet into a member, the adhesion of zinc powder or the like to the press mold due to peeling of the galvanized layer can be suppressed, and the occurrence of surface defects of the steel sheet resulting from the adhesion can be suppressed. Thus, the high strength member according to aspects of the present invention has the effect of high productivity during press forming.

As the forming, common processing methods such as press forming may be used without limitations. As the welding, common welding such as spot welding or arc welding may be used without limitations. The high strength member according to aspects of the present invention can be suitably used for, for example, automotive parts.

EXAMPLES

Example 1

The studies shown in Example 1 were performed in order to find the influence of the amount of hydrogen in steel.

Molten steel of the chemical composition shown in Table 1 was smelted with a converter, and was made into a slab under the conditions of a flow velocity of molten steel at the solidification interface in the vicinity of the meniscus of the casting mold of 18 cm/s on average and an average casting rate of 1.8 m/min. The slab was heated to 1200° C., and was made into a hot rolled coil under the conditions of a finish rolling temperature of 840° C. and a coiling temperature of 550° C. Hot rolled steel sheets obtained from the hot rolled coil were pickled, and were then made into cold rolled steel sheets each with a sheet thickness of 1.4 mm under the condition of a cold rolling reduction ratio of 50%. The cold rolled steel sheets were heated to 790° C. (within the range of the Ac3 point+20° C. or less) that is an annealing temperature by annealing treatment in atmosphere in the annealing furnace with various hydrogen concentrations and a dew-point temperature of −20° C., were cooled up to 520° C. at an average cooling rate from the annealing temperature up to 600° C. of 3° C./s, were allowed to stay for 50 seconds, were then galvanized and subjected to alloying treatment, and were cooled from 450° C. to 250° C. at an average cooling rate of 6° C./s; thus, high-strength alloyed galvanized steel sheets (product sheets) were manufactured.

A sample was cut out from each sheet, and hydrogen (the amount of diffusible hydrogen) in the steel was analyzed and bendability was evaluated. The results are shown in the FIGURE.

Amount of Hydrogen in Steel (Amount of Diffusible Hydrogen)

The amount of hydrogen in the steel was measured by the following method. First, an approximately 5×30-mm test piece was cut out from the plated steel sheet, and then a router (precision grinder) was used to remove the plating on a surface of the test piece, and the test piece was put into a quartz tube. Next, the interior of the quartz tube was substituted with Ar, then the temperature was raised at 200° C./hr, and hydrogen generated until reaching 400° C. was analyzed with a gas chromatograph. In this way, the amount of hydrogen released was measured by the programmed temperature analysis method. The cumulative value of the amount of hydrogen detected in the temperature region of room temperature (25° C.) to less than 210° C. was taken as the amount of diffusible hydrogen in steel.

Bendability

A 25×100-mm strip test piece was cut out from each of the manufactured plated steel sheets in such a manner that a direction parallel to the rolling direction corresponded to the short side. Next, a 90° V-bending test was performed such that the rolling direction corresponded to a ridge to be formed by bending. Striking that makes pressing against a die with a load of 10 tons for 5 seconds, with the speed of the stroke set to 50 ram/min, was performed. A test was performed by variously changing the curvature radius R of the tip of a V-shaped punch in units of 0.5 steps, and the vicinity of the ridge of the test piece was observed with a lens with a magnifying power of 20 to check the presence or absence of a crack (cracking). R/t was calculated from the smallest curvature radius R among those at which a crack did not occur and the sheet thickness of the test piece (t (mm); the value up to the one hundredths place calculated by rounding up if the one thousandths place was 5 or more and rounding down if it was 4 or less was used), and the resulting R/t was taken as an index of bendability. The smaller the value of R/t is, the better the bendability is.

It has been shown that, when the amount of diffusible hydrogen in the steel is less than 0.25 mass ppm, bendability (R/t) is stabilized and is excellent. The conditions of inclusions, etc. of these excellent samples were within the ranges according to aspects of the present invention.

obtained from the hot rolled coil was pickled, was subjected to the steps of cold rolling, annealing, plating treatment, width trimming, and post-treatment under the conditions shown in Table 3; thus, a 1.4-mm-thick galvanized steel sheet was manufactured. Alloying treatment of galvanization was performed immediately after plating treatment (galvanization treatment) under conditions of 500° C. and 20 seconds. The steps of width trimming and post-treatment were performed only in part of the manufacturing conditions.

A sample was extracted from the plated steel sheet obtained in the above manner, structure observation and a tensile test were performed by the methods mentioned below, and the tensile strength (TS), the amount of hydrogen in the steel (the amount of diffusible hydrogen), bendability, and the fractions of steel structures were evaluated and measured. Further, plating ability was evaluated. The evaluation method is as follows.

For manufacturing conditions No. 32 of Table 3, also a galvanized steel sheet (Invention Example) was manufactured under the same manufacturing conditions except that alloying treatment of galvanized layer was not performed. As described later, the plating ability of this galvanized steel sheet was evaluated by the presence or absence of a bare spot defect.

(1) Tensile Test

A tensile test was performed with a constant tensile speed (crosshead speed) of 10 mm/min on a JIS No. 5 tensile test piece (JIS Z 2201) taken from the steel sheet in a direction perpendicular to the rolling direction. The tensile strength was defined as the maximum load in the tensile test divided by the initial cross-sectional area of the parallel part of the test piece. When the cross-sectional area of the parallel part was calculated, the thickness was defined as the thickness including that of the coating layer.

(2) Amount of in-Steel Hydrogen (Amount of Diffusible Hydrogen)

The measurement was performed by a similar method to Example 1.

(3) Bendability

The measurement was performed by a similar method to Example 1. In this evaluation, R/t≤3.5 was evaluated as excellent in bendability.

(4) Microstructure Observation

By taking a sample for microstructure observation from the manufactured hot-dip galvanized steel sheet, by polishing an L-cross section (thickness cross section parallel to the rolling direction), by etching the polished cross section through the use of a nital solution, by performing observation through the use of a SEM at a magnification of 1500 times in 3 or more fields of view in the etched cross section in order to obtain image data, and by performing image analysis on the obtained image data, area ratio was determined for each of the observed fields of view, and average value of the determined area ratios was calculated. The observation position was set in the vicinity of a position located ¼ of a sheet thickness from the surface thickness.

TABLE 1

| Steel No. | Chemical composition (mass %) | | | | | | | | | | Ac3 (° C.) | Si/Mn (Mass ratio) |
| --- | --- | --- | --- | --- | --- | --- | --- | --- | --- | --- | --- | --- |
| | C | Si | Mn | P | S | N | Al | Ti | Nb | B | Ca | | |
| A | 0.105 | 1.40 | 2.85 | 0.008 | 0.0008 | 0.0035 | 0.040 | 0.024 | 0.025 | 0.0018 | 0.0003 | 847 | 0.49 |

Example 2

In Example 2, galvanized steel sheets shown below were manufactured and evaluated.

Various kinds of molten steel of the chemical compositions shown in Table 2 were smelted with a converter, and were cast to produce slabs under the conditions shown in Table 3; each slab was reheated to 1200° C. and was hot rolled at a finish temperature of 800 to 830° C., and a hot rolled coil was manufactured under the condition of a coiling temperature of 560° C. A hot rolled steel sheet However, the volume ratio of retained austenite (the volume ratio is regarded as the area ratio) was quantified by the intensity of X-ray diffraction; therefore, there is a case of a result in which the sum total of the structures is more than 100%. F of Table 4 stands for ferrite, M for martensite (including tempered martensite), B for bainite, and Residual γ for retained austenite. The average grain size of ferrite was found by observing 10 grains by SEM, finding the area ratio of each grain, calculating the circle-equivalent diameter, and averaging the circle-equivalent diameters.

In the structure observation mentioned above, pearlite and aggregations of precipitates and inclusions were observed as other phases in some examples.

(5) Inclusion Observation

A ridge portion of the test piece subjected to the 90° V-bending test was forcibly broken, and a cross section of the steel sheet was observed by SEM. The compositions of inclusions existing in an outer layer of the test piece, that is, existing from the surface on the outside of bending to a position of ⅓ of the sheet thickness were found by qualitative analysis based on EDX, and oxides containing at least one or more of Al, Si, Mg, and Ca were identified; then, the longest diameter (the dimension of the portion with the longest grain width) of each of the inclusions in an image was measured, the longest diameter was regarded as the grain size, and the average grain size of the inclusions was found. Further, in the field of view, the distance (the nearest distance) from any inclusion existing in an area extending from the surface to a position of ⅓ of the sheet thickness to an inclusion located nearest to the inclusion was found, the distance mentioned above was calculated for all the inclusions, and the resulting distances were averaged; thus, the average nearest distance was found.

(6) Plating Ability

The surface quality (external appearance) of the manufactured hot-dip galvanized steel sheet was visually observed, and the presence or absence of a bare spot defect was investigated. The term "bare spots" denotes areas having a size of about several micrometers to several millimeters in which no coating layer exists so that the steel sheet is exposed.

Further, the plating peeling resistance (adhesiveness) of the manufactured hot-dip galvanized steel sheet was investigated. In the present Example, a cellophane tape was pressed against a processed portion of the hot-dip galvanized steel sheet where bending of 90° was performed, peeled substances were transferred to the cellophane tape, and the amount of peeled substances on the cellophane tape was found as the counted number of Zn pieces by the X-ray fluorescence method. As measurement conditions, a diameter of a mask of 30 mm, and an accelerating voltage of 50 kV, an accelerating current of 50 mA, and a measuring time of 20 seconds for X-ray fluorescence were used.

Plating ability was evaluated by the following criteria. The results are shown in Table 4. In accordance with aspects of the present invention, rank A, B, or C mentioned below, which has no bare spot defect, was classified as passed.

A: There is no bare spot defect, and the counted number of Zn pieces is less than 7000.

B: There is no bare spot defect, and the counted number of Zn pieces is 7000 or more and less than 8000.

C: There is no bare spot defect, and the counted number of Zn pieces is 8000 or more.

D: A bare spot defect occurs.

The plating ability of the galvanized steel sheet not subjected to alloying treatment described above was evaluated by checking the presence or absence of a bare spot defect. Specifically, the surface quality (external appearance) of the galvanized steel sheet was visually observed, and the presence or absence of a region where plating did not exist and the steel sheet was exposed (the presence or absence of a bare spot defect) was investigated by the order of approximately several micrometers to several millimeters. As a result of the investigation, it has been found that this galvanized steel sheet does not have a bare spot defect and has good plating ability.

(7) Measurement of Amount of Oxides Containing at Least One or More Elements Selected from Fe, Si, Mn, Al, P, B, Nb, Ti, Cr, Mo, V, Cu, and Ni and Existing in Outer Layer Portion of Steel Sheet within 100 μm from Surface of Underlying Steel Sheet The amount of oxides was measured by an "impulse furnace—infrared absorption method". However, it is necessary to subtract the amount of oxygen contained in the material (that is, the steel sheet before performing annealing); thus, in accordance with aspects of the present invention, outer layer portions of both surfaces of the steel sheet after continuous annealing were polished 100 μm or more, and the concentration of in-steel oxygen was measured and the measurement value was taken as the amount of oxygen OH contained in the material, and further the concentration of in-steel oxygen in the entire sheet thickness direction of the steel sheet after continuous annealing was measured and the measurement value was taken as the amount of oxygen OI after internal oxidation. Using the amount of oxygen OI after internal oxidation of the steel sheet and the amount of oxygen OH originally contained in the material thus obtained, the difference between OI and OH (=OI−OH) was calculated; and a value (g/m$^2$) obtained by converting the resulting value to the amount per unit area of one surface was taken as the amount of oxides.

TABLE 2

| Steel No. | Chemical composition (mass %) | | | | | | | | Ac3 (° C.) | Si/Mn (Mass ratio) | Remarks |
|---|---|---|---|---|---|---|---|---|---|---|---|
| | C | Si | Mn | P | S | N | Al | Others | | | |
| A | 0.105 | 1.40 | 2.85 | 0.008 | 0.0008 | 0.0035 | 0.040 | Ti: 0.024, Nb: 0.025, B: 0.0018, Ca: 0.0003 | 847 | 0.49 | Conforming steel |
| B | 0.115 | 0.65 | 2.75 | 0.007 | 0.0009 | 0.0040 | 0.033 | Ti: 0.022, Nb: 0.018, V: 0.005, Ca: 0.0001 | 810 | 0.24 | Conforming steel |
| C | 0.140 | 1.50 | 2.85 | 0.010 | 0.0010 | 0.0035 | 0.040 | — | 832 | 0.53 | Conforming steel |
| D | 0.140 | 0.68 | 3.32 | 0.010 | 0.0010 | 0.0035 | 0.060 | — | 789 | 0.20 | Conforming steel |
| E | 0.086 | 1.00 | 2.85 | 0.015 | 0.0010 | 0.0035 | 0.040 | Zr: 0.042 | 826 | 0.35 | Conforming steel |
| F | 0.191 | 1.00 | 2.85 | 0.010 | 0.0016 | 0.0035 | 0.040 | — | 797 | 0.35 | Conforming steel |
| G | 0.140 | 1.88 | 2.85 | 0.010 | 0.0010 | 0.0050 | 0.040 | — | 849 | 0.66 | Conforming steel |
| H | 0.140 | 1.00 | 1.65 | 0.010 | 0.0010 | 0.0035 | 0.040 | — | 846 | 0.61 | Conforming steel |
| I | 0.140 | 1.00 | 2.85 | 0.010 | 0.0010 | 0.0035 | 0.040 | Mo: 0.10, Cr: 0.20 | 810 | 0.35 | Conforming steel |
| J | 0.140 | 1.00 | 2.85 | 0.010 | 0.0010 | 0.0035 | 0.040 | Cu: 0.25, Ni: 0.18 | 810 | 0.35 | Conforming steel |

TABLE 2-continued

| Steel No. | Chemical composition (mass %) | | | | | | | | Ac3 (° C.) | Si/Mn (Mass ratio) | Remarks |
|---|---|---|---|---|---|---|---|---|---|---|---|
| | C | Si | Mn | P | S | N | Al | Others | | | |
| K | 0.140 | 1.00 | 2.85 | 0.010 | 0.0010 | 0.0035 | 0.040 | Sb: 0.010 | 810 | 0.35 | Conforming steel |
| L | 0.140 | 1.00 | 2.85 | 0.010 | 0.0010 | 0.0035 | 0.040 | Sn: 0.02 | 810 | 0.35 | Conforming steel |
| M | 0.060 | 1.00 | 2.85 | 0.010 | 0.0010 | 0.0035 | 0.040 | — | 836 | 0.35 | Comparative steel |
| N | 0.240 | 1.00 | 2.85 | 0.010 | 0.0010 | 0.0035 | 0.040 | — | 786 | 0.35 | Comparative steel |
| O | 0.140 | 2.25 | 2.85 | 0.010 | 0.0010 | 0.0035 | 0.040 | — | 866 | 0.79 | Comparative steel |
| P | 0.140 | 1.00 | 1.26 | 0.010 | 0.0010 | 0.0035 | 0.040 | — | 858 | 0.79 | Comparative steel |
| Q | 0.140 | 0.52 | 3.80 | 0.010 | 0.0010 | 0.0035 | 0.040 | — | 760 | 0.14 | Comparative steel |
| R | 0.140 | 1.00 | 2.85 | 0.010 | 0.0030 | 0.0035 | 0.040 | — | 811 | 0.35 | Comparative steel |
| S | 0.140 | 1.00 | 2.85 | 0.010 | 0.0010 | 0.0035 | 0.130 | — | 846 | 0.35 | Comparative steel |

TABLE 3

| No. | Steel No. | Casting Flow velocity of molten steel *1 (cm/s) | Cold rolling Rolling ratio (%) | Annealing temperature (° C.) | In-furnace Hydrogen concentration (vol %) | In-furnace Dew-point temperature (° C.) | Average cooling rate Annealing temperature to 600° C. (° C./s) | Plating *2 (° C./s) |
|---|---|---|---|---|---|---|---|---|
| 1 | A | 22 | 45 | 820 | 5 | −15 | 4 | 5 |
| 2 | A | 22 | 45 | 820 | 5 | 5 | 4 | 5 |
| 3 | A | 22 | 45 | 820 | 5 | −25 | 4 | 5 |
| 4 | B | 18 | 50 | 800 | 9 | −30 | 5 | 6 |
| 5 | B | 18 | 50 | 800 | 9 | −10 | 5 | 6 |
| 6 | B | 21 | 50 | 800 | 9 | −10 | 5 | 6 |
| 7 | B | 10 | 50 | 800 | 9 | −5 | 5 | 6 |
| 8 | B | 18 | 50 | 700 | 9 | −5 | 5 | 6 |
| 9 | B | 18 | 50 | 780 | 15 | −10 | 5 | 6 |
| 10 | B | 18 | 50 | 840 | 9 | −5 | 5 | 6 |
| 11 | B | 18 | 50 | 800 | 0.5 | −5 | 5 | 6 |
| 12 | B | 18 | 50 | 800 | 9 | −5 | 1 | 6 |
| 13 | B | 18 | 50 | 800 | 9 | −5 | 5 | 1 |
| 14 | B | 18 | 50 | 720 | 9 | −25 | 2 | 2 |
| 15 | B | 16 | 50 | 800 | 9 | −5 | 5 | 6 |
| 16 | B | 18 | 50 | 800 | 1 | −5 | 5 | 6 |
| 17 | B | 18 | 50 | 800 | 12 | −20 | 5 | 6 |
| 18 | B | 18 | 50 | 800 | 9 | −5 | 3 | 6 |
| 19 | B | 18 | 50 | 800 | 9 | −5 | 5 | 3 |
| 20 | B | 18 | 50 | 800 | 9 | −5 | 5 | 6 |
| 21 | B | 18 | 50 | 800 | 9 | −5 | 5 | 6 |
| 22 | B | 18 | 50 | 800 | 9 | −35 | 5 | 6 |
| 23 | C | 20 | 50 | 810 | 9 | 5 | 5 | 6 |
| 24 | D | 20 | 50 | 760 | 9 | −15 | 5 | 6 |
| 25 | E | 17 | 50 | 780 | 9 | −5 | 5 | 6 |
| 26 | F | 17 | 50 | 770 | 9 | −5 | 5 | 6 |
| 27 | G | 17 | 50 | 780 | 9 | −5 | 5 | 6 |
| 28 | H | 17 | 50 | 780 | 9 | −10 | 5 | 6 |
| 29 | I | 17 | 50 | 780 | 9 | −5 | 5 | 6 |
| 30 | J | 17 | 50 | 780 | 9 | −5 | 5 | 6 |
| 31 | K | 17 | 50 | 780 | 9 | −5 | 5 | 6 |
| 32 | L | 17 | 50 | 780 | 9 | −5 | 5 | 6 |
| 33 | M | 17 | 50 | 800 | 9 | −5 | 5 | 6 |
| 34 | N | 17 | 50 | 780 | 9 | −5 | 5 | 6 |
| 35 | O | 17 | 50 | 800 | 9 | −5 | 5 | 6 |
| 36 | P | 17 | 50 | 780 | 9 | −5 | 5 | 6 |
| 37 | Q | 17 | 50 | 780 | 9 | −25 | 5 | 6 |
| 38 | R | 17 | 50 | 780 | 9 | −5 | 5 | 6 |
| 39 | S | 25 | 50 | 780 | 9 | −5 | 5 | 6 |

| No. | Width trimming Presence or absence | Post-treatment Hydrogen concentration (vol %) | Post-treatment Dew-point temperature (° C.) | Heating Temperature (° C.) | Heating Time (min) | Remarks |
|---|---|---|---|---|---|---|
| 1 | Absence | 0 | 0 | 100 | 2880 | Invented example |
| 2 | Absence | 0 | 0 | 100 | 2880 | Invented example |
| 3 | Absence | 0 | 0 | 100 | 2880 | Invented example |
| 4 | Absence | — | — | — | — | Comparative example |
| 5 | Absence | — | — | — | — | Invented example |
| 6 | Absence | 0 | 0 | 50 | 5 | Invented example |

TABLE 3-continued

| | | | | | | |
|---|---|---|---|---|---|---|
| 7 | Absence | — | — | — | — | Comparative example |
| 8 | Absence | — | — | — | — | Comparative example |
| 9 | Absence | — | — | — | — | Comparative example |
| 10 | Absence | — | — | — | — | Comparative example |
| 11 | Absence | — | — | — | — | Invented example |
| 12 | Absence | — | — | — | — | Comparative example |
| 13 | Absence | — | — | — | — | Comparative example |
| 14 | Absence | — | — | — | — | Comparative example |
| 15 | Absence | — | — | — | — | Invented example |
| 16 | Absence | — | — | — | — | Invented example |
| 17 | Absence | — | — | — | — | Invented example |
| 18 | Absence | — | — | — | — | Invented example |
| 19 | Absence | — | — | — | — | Invented example |
| 20 | Presence | — | — | — | — | Invented example |
| 21 | Absence | 5 | 0 | 70 | 0.5 | Invented example |
| 22 | Absence | 10 | 0 | 70 | 0.5 | Comparative example |
| 23 | Absence | — | — | — | — | Invented example |
| 24 | Absence | — | — | — | — | Invented example |
| 25 | Absence | — | — | — | — | Invented example |
| 26 | Absence | — | — | — | — | Invented example |
| 27 | Absence | — | — | — | — | Invented example |
| 28 | Absence | — | — | — | — | Invented example |
| 29 | Absence | — | — | — | — | Invented example |
| 30 | Absence | — | — | — | — | Invented example |
| 31 | Absence | — | — | — | — | Invented example |
| 32 | Absence | — | — | — | — | Invented example |
| 33 | Absence | — | — | — | — | Comparative example |
| 34 | Absence | — | — | — | — | Comparative example |
| 35 | Absence | — | — | — | — | Comparative example |
| 36 | Absence | — | — | — | — | Comparative example |
| 37 | Absence | — | — | — | — | Comparative example |
| 38 | Absence | — | — | — | — | Comparative example |
| 39 | Absence | — | — | — | — | Comparative example |

*1 A flow velocity of molten steel at a solidification interface in vicinity of a meniscus of a casting mold,
*2 An average cooling rate from 450° C. to 250° C. after the plating treatment

TABLE 4

| | | Steel sheet material quality | | | | | | |
|---|---|---|---|---|---|---|---|---|
| | | Inclusions *1 | | | | | Amount of | Steel |
| No. | Steel No. | Average grain size (μm) | Average nearest distance (μm) | Coating weight *2 (g/m$^2$) | Amount of oxides *3 (g/m$^2$) | Plating ability evaluation | diffusible hydrogen (Mass ppm) | structure F Area ratios (%) |
| 1 | A | 40 | 55 | 40 | 0.160 | A | 0.12 | 30 |
| 2 | A | 40 | 55 | 40 | 0.230 | A | 0.12 | 30 |
| 3 | A | 40 | 55 | 40 | 0.100 | B | 0.12 | 30 |
| 4 | B | 30 | 50 | 55 | 0.005 | D | 0.11 | 35 |
| 5 | B | 30 | 50 | 55 | 0.120 | A | 0.11 | 35 |
| 6 | B | 15 | 100 | 50 | 0.110 | A | 0.06 | 35 |
| 7 | B | 50 | 15 | 50 | 0.150 | A | 0.13 | 35 |
| 8 | B | 30 | 50 | 60 | 0.040 | B | 0.09 | 100 |
| 9 | B | 30 | 50 | 55 | 0.110 | A | 0.44 | 50 |
| 10 | B | 20 | 65 | 55 | 0.180 | A | 0.62 | 5 |
| 11 | B | 20 | 65 | 45 | 0.143 | C | 0.16 | 25 |
| 12 | B | 20 | 65 | 55 | 0.152 | A | 0.15 | 35 |
| 13 | B | 20 | 65 | 50 | 0.150 | A | 0.14 | 30 |
| 14 | B | 20 | 65 | 45 | 0.018 | B | 0.09 | 100 |
| 15 | B | 50 | 20 | 50 | 0.110 | B | 0.14 | 25 |
| 16 | B | 20 | 65 | 50 | 0.160 | B | 0.11 | 25 |
| 17 | B | 20 | 65 | 55 | 0.065 | A | 0.24 | 25 |
| 18 | B | 20 | 65 | 55 | 0.152 | A | 0.14 | 30 |
| 19 | B | 20 | 65 | 55 | 0.155 | A | 0.14 | 30 |
| 20 | B | 20 | 65 | 55 | 0.150 | B | 0.08 | 25 |
| 21 | B | 20 | 65 | 50 | 0.140 | A | 0.09 | 25 |
| 22 | B | 20 | 65 | 50 | 0.002 | D | 0.11 | 25 |
| 23 | C | 15 | 70 | 100 | 0.170 | B | 0.13 | 28 |
| 24 | D | 35 | 50 | 55 | 0.015 | B | 0.12 | 15 |
| 25 | E | 15 | 65 | 55 | 0.105 | B | 0.14 | 35 |
| 26 | F | 15 | 65 | 55 | 0.120 | A | 0.14 | 13 |
| 27 | G | 30 | 60 | 45 | 0.210 | B | 0.14 | 28 |
| 28 | H | 20 | 65 | 50 | 0.124 | A | 0.14 | 35 |
| 29 | I | 20 | 65 | 55 | 0.154 | A | 0.14 | 25 |
| 30 | J | 20 | 65 | 55 | 0.160 | A | 0.14 | 25 |
| 31 | K | 20 | 65 | 55 | 0.153 | A | 0.14 | 25 |

TABLE 4-continued

| No. | | | | | | | | |
|---|---|---|---|---|---|---|---|---|
| 32 | L | 20 | 65 | 55 | 0.157 | A | 0.14 | 25 |
| 33 | M | 20 | 65 | 55 | 0.154 | A | 0.14 | 50 |
| 34 | N | 30 | 53 | 55 | 0.132 | A | 0.17 | 10 |
| 35 | O | 35 | 60 | 45 | 0.240 | D | 0.14 | 33 |
| 36 | P | 20 | 65 | 55 | 0.120 | A | 0.14 | 35 |
| 37 | Q | 20 | 65 | 45 | 0.009 | D | 0.14 | 10 |
| 38 | R | 35 | 40 | 55 | 0.152 | A | 0.14 | 25 |
| 39 | S | 80 | 25 | 55 | 0.150 | A | 0.16 | 35 |

| | Steel structure | | | | Mechanical properties | | |
|---|---|---|---|---|---|---|---|
| No. | F Average grain size (μm) | M Area ratios (%) | B Area ratios (%) | Retained γ Area ratios (%) | Others Area ratios (%) | TS (MPa) | Bendability R/t | Remarks |
| 1 | 8 | 55 | 10 | 4 | 1 | 1222 | 2.1 | Invented example |
| 2 | 8 | 55 | 10 | 4 | 1 | 1220 | 2.1 | Invented example |
| 3 | 8 | 55 | 10 | 4 | 1 | 1219 | 2.1 | Invented example |
| 4 | 8 | 55 | 10 | 0 | 0 | 1208 | 2.5 | Comparative example |
| 5 | 8 | 55 | 10 | 0 | 0 | 1209 | 2.5 | Invented example |
| 6 | 8 | 55 | 10 | 0 | 0 | 1211 | 1.4 | Invented example |
| 7 | 8 | 55 | 10 | 0 | 0 | 1215 | 5.3 | Comparative example |
| 8 | 14 | 0 | 0 | 0 | 0 | 853 | 1.1 | Comparative example |
| 9 | 10 | 45 | 5 | 0 | 0 | 1206 | 4.6 | Comparative example |
| 10 | 6 | 75 | 20 | 0 | 0 | 1233 | 5.2 | Comparative example |
| 11 | 6 | 70 | 5 | 0 | 0 | 1248 | 2.2 | Invented example |
| 12 | 35 | 50 | 5 | 0 | 10 | 1078 | 2.1 | Comparative example |
| 13 | 10 | 30 | 30 | 5 | 5 | 1072 | 2.1 | Comparative example |
| 14 | 30 | 0 | 0 | 0 | 0 | 804 | 1.0 | Comparative example |
| 15 | 6 | 70 | 5 | 0 | 0 | 1245 | 3.4 | Invented example |
| 16 | 6 | 70 | 5 | 0 | 0 | 1256 | 1.4 | Invented example |
| 17 | 6 | 70 | 5 | 0 | 0 | 1251 | 3.3 | Invented example |
| 18 | 10 | 60 | 5 | 0 | 5 | 1156 | 2.0 | Invented example |
| 19 | 6 | 50 | 15 | 4 | 1 | 1152 | 2.0 | Invented example |
| 20 | 6 | 70 | 5 | 0 | 0 | 1253 | 2.0 | Invented example |
| 21 | 6 | 70 | 5 | 0 | 0 | 1255 | 1.6 | Invented example |
| 22 | 6 | 70 | 5 | 0 | 0 | 1250 | 2.2 | Comparative example |
| 23 | 4 | 65 | 4 | 3 | 0 | 1280 | 2.3 | Invented example |
| 24 | 3 | 85 | 0 | 0 | 0 | 1492 | 3.2 | Invented example |
| 25 | 8 | 55 | 5 | 0 | 5 | 1103 | 1.8 | Invented example |
| 26 | 4 | 75 | 10 | 2 | 0 | 1460 | 3.3 | Invented example |
| 27 | 10 | 58 | 11 | 3 | 0 | 1264 | 2.4 | Invented example |
| 28 | 8 | 60 | 0 | 0 | 5 | 1125 | 2.5 | Invented example |
| 29 | 4 | 70 | 5 | 0 | 0 | 1280 | 2.5 | Invented example |
| 30 | 8 | 70 | 5 | 0 | 0 | 1283 | 2.4 | Invented example |
| 31 | 8 | 70 | 5 | 0 | 0 | 1135 | 2.4 | Invented example |
| 32 | 8 | 70 | 5 | 0 | 0 | 1134 | 2.1 | Invented example |
| 33 | 8 | 50 | 0 | 0 | 0 | 1004 | 1.4 | Comparative example |
| 34 | 3 | 85 | 5 | 0 | 0 | 1510 | 5.0 | Comparative example |
| 35 | 8 | 52 | 10 | 5 | 0 | 1205 | 2.5 | Comparative example |
| 36 | 10 | 55 | 5 | 0 | 5 | 1006 | 2.5 | Comparative example |
| 37 | 3 | 90 | 0 | 0 | 0 | 1500 | 2.5 | Comparative example |
| 38 | 8 | 70 | 5 | 0 | 0 | 1204 | 4.3 | Comparative example |
| 39 | 8 | 55 | 10 | 0 | 0 | 1180 | 4.5 | Comparative example |

*1 Inclusions containing at least one of Al, Si, Mg, and Ca and existing in an area extending from a surface to a position of ⅓ of a sheet thickness,
*2 A coating weight per one surface of a steel sheet
*3 Amount of oxides containing at least one or more elements selected from Fe, Si, Mn, Al, P, B, Nb, Ti, Cr, Mo, V, Cu, and Ni and existing in an outer layer portion of the steel sheet within 100 μm from a surface of an underlying steel sheet
F: Ferrite,
M: Martensite,
B: Bainite,
Retained γ: Retained austenite The galvanized steel sheets of Present Invention Examples obtained by means of components and manufacturing conditions in the ranges according to aspects of the present invention had TS≥1100 MPa or more, which indicates high strength, had R/t≤3.5, which indicates excellent bendability, and was excellent in plating ability. On the other hand, in the galvanized steel sheets of the Comparative Examples, at least one of these properties was poorer than in the Present Invention Examples.

Example 3

A galvanized steel sheet of manufacturing conditions No. 1 (Present Invention Example) of Table 3 of Example 2 was press-formed to manufacture a member of a Present Invention Example. Further, a galvanized steel sheet of manufacturing conditions No. 1 (Present Invention Example) of Table 3 of Example 2 and a galvanized steel sheet of manufacturing conditions No. 2 (Present Invention Example) of Table 3 of Example 2 were joined together by spot welding to manufacture a member of a Present Invention Example. It has been verified that these members of Present Invention Examples are excellent in bendability and plating ability and can therefore be suitably used for automotive parts or the like.

INDUSTRIAL APPLICABILITY

The high-strength galvanized steel sheet according to embodiments of the present invention has not only a high tensile strength but also good bendability and good plating ability. Therefore, the high-strength galvanized steel sheet according to embodiments of the present invention contributes to environment conservation, for example, from the viewpoint of $CO_2$ emission by contributing to an improvement in safety performance and to a decrease in the weight of an automobile body through an improvement in strength and a decrease in thickness, in the case where the steel sheet is used for the frame members, in particular, for the parts around a cabin, which has an influence on crash safety, of an automobile body. In addition, since the steel sheet has both good surface quality and coating quality, it is possible to actively use for parts such as chassis which are prone to corrosion due to rain or snow, and it is also possible to expect an improvement in the rust prevention capability and corrosion resistance of an automobile body. A material having such properties can effectively be used not only for automotive parts but also in the industrial fields of civil engineering, construction, and home electrical appliances.

The invention claimed is:

1. A high-strength galvanized steel sheet comprising:
a steel sheet having a chemical composition containing a steel composition containing, in mass %,
C: 0.08% or more and 0.20% or less,
Si: less than 2.0%,
Mn: 1.5% or more and 3.5% or less,
P: 0.02% or less,
S: 0.002% or less,
Al: 0.10% or less, and
N: 0.006% or less,
a mass ratio of a content of Si to a content of Mn in the steel (Si/Mn) being 0.2 or more, and the balance: Fe and incidental impurities, and
a steel structure in which an average grain size of inclusions containing at least one of Al, Si, Mg, and Ca and existing in an area extending from a surface to a position of ⅓ of a sheet thickness is 50 μm or less, and an average nearest distance between the inclusions is 20 μm or more; and
a galvanized layer provided on a surface of the steel sheet and having a coating weight per one surface of 20 g/m² or more and 120 g/m² or less,
wherein an amount of diffusible hydrogen contained in the steel sheet is less than 0.25 mass ppm,
oxides containing at least one or more elements selected from Fe, Si, Mn, Al, P, B, Nb, Ti, Cr, Mo, V, Cu, and Ni and existing in an outer layer portion of the steel sheet within 100 μm from a surface of an underlying steel sheet immediately below the galvanized layer account for 0.010 g/m² or more per one surface, and
a tensile strength is 1100 MPa or more,
and wherein the steel structure contains 30% or more and 85% or less of martensite, 60% or less (including 0%) of ferrite, 15% or less (including 0%) of bainite, and less than 5% (including 0%) of retained austenite in terms of area ratio, and
an average grain size of ferrite is 15 μm or less.

2. The high-strength galvanized steel sheet according to claim 1, wherein the chemical composition further contains, in mass %, at least one of (1) to (5) below,
(1) one or more of Ti, Nb, V, and Zr: 0.005% or more and 0.1% or less in total,
(2) one or more of Mo, Cr, Cu, and Ni: 0.01% or more and 0.5% or less in total,
(3) B: 0.0003% or more and 0.005% or less,
(4) at least one of Sb: 0.001% or more and 0.1% or less and Sn: 0.001% or more and 0.1% or less, and
(5) Ca: 0.0005% or less.

3. A method for manufacturing the high-strength galvanized steel sheet according to claim 1, comprising: a casting step of casting steel having the chemical composition under a condition where a flow velocity of molten steel at a solidification interface in vicinity of a meniscus of a casting mold is 16 cm/s or more, and producing a steel raw material;
a hot rolling step of hot rolling the steel raw material after the casting step, thereby producing a steel sheet;
a pickling step of pickling the steel sheet after the hot rolling step;
a cold rolling step of cold rolling the steel sheet after the pickling step at a rolling reduction ratio of 20% or more and 80% or less;
an annealing step of heating the steel sheet after the cold rolling step in a continuous annealing line at an annealing temperature of 740° C. or more and (Ac3+20)° C. or less in an atmosphere in a furnace of the continuous annealing line in which a hydrogen concentration in a temperature region of 500° C. or more is more than 0 vol % and 12 vol % or less and a dew-point temperature in a temperature region of 740° C. or more is −25° C. or more, and then performing cooling at an average cooling rate of 3° C./s or more from the annealing temperature to at least 600° C.; and
a plating step of subjecting the steel sheet after the annealing step to plating treatment, and after the plating treatment, performing cooling at an average cooling rate of 3° C./s or more through a temperature region of 450° C. to 250° C.

4. A method for manufacturing the high-strength galvanized steel sheet according to claim 2, comprising: a casting step of casting steel having the chemical composition under a condition where a flow velocity of molten steel at a solidification interface in vicinity of a meniscus of a casting mold is 16 cm/s or more, and producing a steel raw material;
a hot rolling step of hot rolling the steel raw material after the casting step, thereby producing a steel sheet;
a pickling step of pickling the steel sheet after the hot rolling step;
a cold rolling step of cold rolling the steel sheet after the pickling step at a rolling reduction ratio of 20% or more and 80% or less;
an annealing step of heating the steel sheet after the cold rolling step in a continuous annealing line at an annealing temperature of 740° C. or more and (Ac3+20) ° C. or less in an atmosphere in a furnace of the continuous annealing line in which a hydrogen concentration in a temperature region of 500° C. or more is more than 0 vol % and 12 vol % or less and a dew-point temperature in a temperature region of 740° C. or more is −25° C. or more, and then performing cooling at an average cooling rate of 3° C./s or more from the annealing temperature to at least 600° C.; and
a plating step of subjecting the steel sheet after the annealing step to plating treatment, and after the plating treatment, performing cooling at an average cooling rate of 3° C./s or more through a temperature region of 450° C. to 250° C.

5. The method according to claim 3, further comprising at least one of (1) and (2) below,
   (1) after the plating step, a width trimming step of performing width trimming, and
   (2) after the annealing step or after the plating step, a post-treatment step of performing heating in a temperature region of 50 to 400° C. for 30 seconds or more in an atmosphere with a hydrogen concentration of 5 vol % or less and a dew-point temperature of 50° C. or less.

6. The method according to claim 4, further comprising at least one of (1) and (2) below,
   (1) after the plating step, a width trimming step of performing width trimming, and
   (2) after the annealing step or after the plating step, a post-treatment step of performing heating in a temperature region of 50 to 400° C. for 30 seconds or more in an atmosphere with a hydrogen concentration of 5 vol % or less and a dew-point temperature of 50° C. or less.

7. The method according to claim 3, wherein alloying treatment is performed immediately after the plating treatment in the plating step.

8. The method according to claim 4, wherein alloying treatment is performed immediately after the plating treatment in the plating step.

9. The method according to claim 5, wherein alloying treatment is performed immediately after the plating treatment in the plating step.

10. The method according to claim 6, wherein alloying treatment is performed immediately after the plating treatment in the plating step.

11. A high strength member, obtained by subjecting the high-strength galvanized steel sheet according to claim 1 to at least either one of forming and welding.

12. A high strength member, obtained by subjecting the high-strength galvanized steel sheet according to claim 2 to at least either one of forming and welding.

13. A method for manufacturing a high strength member, comprising a step of performing at least either one of forming and welding on a high-strength galvanized steel sheet manufactured by the method according to claim 3.

14. A method for manufacturing a high strength member, comprising a step of performing at least either one of forming and welding on a high-strength galvanized steel sheet manufactured by the method according to claim 4.

15. A method for manufacturing a high strength member, comprising a step of performing at least either one of forming and welding on a high-strength galvanized steel sheet manufactured by the method according to claim 5.

16. A method for manufacturing a high strength member, comprising a step of performing at least either one of forming and welding on a high-strength galvanized steel sheet manufactured by the method according to claim 6.

17. A method for manufacturing a high strength member, comprising a step of performing at least either one of forming and welding on a high-strength galvanized steel sheet manufactured by the method according to claim 7.

18. A method for manufacturing a high strength member, comprising a step of performing at least either one of forming and welding on a high-strength galvanized steel sheet manufactured by the method according to claim 8.

19. A method for manufacturing a high strength member, comprising a step of performing at least either one of forming and welding on a high-strength galvanized steel sheet manufactured by the method according to claim 9.

20. A method for manufacturing a high strength member, comprising a step of performing at least either one of forming and welding on a high-strength galvanized steel sheet manufactured by the method according to claim 10.

* * * * *